United States Patent
Sekar

(10) Patent No.: US 11,474,851 B2
(45) Date of Patent: Oct. 18, 2022

(54) SYSTEMS AND METHODS FOR EFFICIENT SCALABILITY AND HIGH AVAILABILITY OF APPLICATIONS IN CONTAINER ORCHESTRATION CLOUD ENVIRONMENT

(71) Applicant: OPEN TEXT HOLDINGS, INC., San Mateo, CA (US)

(72) Inventor: Dhatchana Moorthy Sekar, Bangalore (IN)

(73) Assignee: Open Text Holdings, Inc., San Mateo, CA (US)

(*) Notice: Subject to any disclaimer, the term of this patent is extended or adjusted under 35 U.S.C. 154(b) by 373 days.

(21) Appl. No.: 16/843,671

(22) Filed: Apr. 8, 2020

(65) Prior Publication Data

US 2021/0318899 A1 Oct. 14, 2021

(51) Int. Cl.
*G06F 9/455* (2018.01)
*G06F 9/50* (2006.01)
(Continued)

(52) U.S. Cl.
CPC .......... *G06F 9/45558* (2013.01); *G06F 9/505* (2013.01); *G06F 16/24552* (2019.01); *H04L 61/4511* (2022.05); *G06F 2009/45595* (2013.01)

(58) Field of Classification Search
CPC ....... G06F 16/24552; G06F 2009/4557; G06F 2009/45595; G06F 9/45558; G06F 9/505; H04L 61/4511
See application file for complete search history.

(56) References Cited

U.S. PATENT DOCUMENTS 10,841,152 B1 * 11/2020 Humphreys ............ H04L 67/10
10,992,733 B1 * 4/2021 Wang .................. H04L 67/1008
(Continued)

FOREIGN PATENT DOCUMENTS

KR      101807806 B1 * 12/2017 .......... G06F 9/5077
WO  WO-2004077259 A2 *  9/2004 .......... G06F 9/5033
(Continued)

OTHER PUBLICATIONS

"Kubernetes" [ retrieved from Wikipedia <<https//en.wikipedia.org/wiki/Kubernetes>>. on Nov. 25, 2019]. 10 pages.
(Continued)

*Primary Examiner* — Alina A Boutah
(74) *Attorney, Agent, or Firm* — Sprinkle IP Law Group

(57) ABSTRACT

The disclosure provides efficient scalability and high availability of applications in a container orchestration cloud environment. A readiness orchestrator monitors the readiness of an application. Configuration data is managed by a configuration cache manger and can be stored locally or in a centralized database. The configuration for each subsystem is managed using a fully-qualified domain name (FQDN). The FQDN can be obtained using a Domain Name System (DNS) service. The load data of a content server (CS) subsystem and an independent Java method server (iJMS) subsystem are obtained and stored in the database. A helper pod is adapted for auto-scaling depending upon the load data and the configuration data of the CS subsystem and the iJMS subsystem to thereby maintain high availability of the CS subsystem and the iJMS subsystem in the container orchestration cloud environment.

20 Claims, 5 Drawing Sheets

(51) Int. Cl.
*G06F 16/2455* (2019.01)
*H04L 61/4511* (2022.01)

(56) References Cited

U.S. PATENT DOCUMENTS

| | | | |
|---|---|---|---|
| 11,245,748 B1* | 2/2022 | Hannon | H04L 67/10 |
| 2016/0306719 A1* | 10/2016 | Laicher | G06F 11/2028 |
| 2019/0347127 A1* | 11/2019 | Coady | G06F 9/45558 |
| 2021/0132974 A1* | 5/2021 | Watt, Jr. | G06F 9/4856 |
| 2022/0066837 A1* | 3/2022 | Garaga | G06F 16/182 |

FOREIGN PATENT DOCUMENTS

| | | | | |
|---|---|---|---|---|
| WO | WO-2020017844 A1 * | 1/2020 | | G06F 11/3006 |
| WO | WO-2020017846 A1 * | 1/2020 | | G06F 3/0601 |
| WO | WO-2020043307 A1 * | 3/2020 | | H04L 12/2803 |

OTHER PUBLICATIONS

"Pods," [retrieved from <<https://kubernetes.io/docs/concepts/workloads/pods/pod/>> on Nov. 25, 2019], 9 pages.

\* cited by examiner

SYSTEMS AND METHODS FOR EFFICIENT SCALABILITY AND HIGH AVAILABILITY OF APPLICATIONS IN CONTAINER ORCHESTRATION CLOUD ENVIRONMENT

TECHNICAL FIELD

This disclosure relates generally to the field of content management. More particularly, this disclosure relates to systems, methods, and computer program products for providing efficient scalability and high availability of applications in a container orchestration cloud environment.

BACKGROUND OF THE RELATED ART

Content management refers to the creation and modification of digital content. A content management system (CMS) refers to a computer system that can be used to manage the creation and modification of digital content. Traditionally, a content management system operates the premises of an enterprise, generally at the backend of a secure enterprise computing network.

Cloud computing refers to the on-demand availability of computer system resources, particularly data storage and computational power of data centers. End users are generally not involved in the direct, active management of cloud computing.

From the perspective of an enterprise, moving content management to the cloud can provide some flexibility in customization and integrations. However, session management, load balancing, and payload environment can impose major obstacles.

For instance, a session is a temporary and interactive information interchange between two or more communicating devices. Session management refers to the process of securing multiple requests to a service from the same device or entity (e.g., a user). In many cases, a session is initialized by authenticating a user or entity with factors such as a password. Traditionally, cookies are used as session identifiers for session management. Cookies are small pieces of information that are sent in response from a server to a client. This means that an intermediary, such as a monitoring system, cannot intercept or read session activities through existing protocols (such as the transmission control protocol or TCP) when two enterprise systems, acting as a server and a client, are in a session communicating with each other through a socket connection.

In view of the foregoing, there is room for innovations and improvements for providing content management in a cloud environment.

SUMMARY OF THE DISCLOSURE

An object of the invention is to provide a container orchestration cloud environment adapted for efficient scalability and high availability applications. In some embodiments, the container orchestration cloud environment has the following features: a readiness monitor configured for keeping track of which system in the container orchestration cloud environment is ready, a helper pod configured for tracking the load of each system, a host name Domain Name System (DNS) for providing a fully-qualified domain name for each system in the container orchestration cloud environment, and a configuration cache manager configured for keeping track of configuration information for each instance of the system.

In some embodiments, the readiness monitor can be implemented using a container orchestration system. Such a container orchestration system automates the deployment, management, scaling, and networking of containers. A "container" refers to an application deployment unit that provides a self-contained execution environment, useful for deploying microservice-based applications. Containers make it possible to run multiple parts of an application independently in microservices, on the same hardware, with much greater control over individual pieces and life cycles. Containers and container orchestration systems are known to those skilled in the art and thus are not further described herein.

In a container orchestration system, a readiness probe or monitor can be used to determine whether a container is ready to service requests. In this disclosure, the readiness monitor is configured for tracking the number of user requests for an application (e.g., a cloud-based content server). If the load increases, it spawns additional instances of the application dynamically. This allows the application to scale automatically and maintain high availability in the container orchestration cloud environment.

In this disclosure, the system load is managed by a helper pod. In a container orchestration system, a pod generally refers to a higher level of abstraction that groups containerized components. The helper pod disclosed herein is assigned a unique Internet Protocol (IP) address in the container orchestration cloud environment and is configured for updating load balancing data stored in a database.

The load balancing data populated/updated by the readiness monitor and the helper pod disclosed herein can be used by a session manager for load balancing and payload management. For instance, a client system may send a request to a content server to execute a method. To service this request, the content server initiates a session with a Java Method Service (JMS) server. In this case, both the content server and the JMS server operate in the container orchestration cloud environment. In an on-premises enterprise architecture, high availability between enterprise systems can be maintained through configuration management of settings in a centralized database. However, a conventional cloud environment does not have an infrastructure that supports configuration management of settings in a centralized database. Thus, a cloud-based session manager ordinarily cannot obtain load balancing data or payload data from the communication between the content server (CS) and the JMS server.

The invention addresses this drawback by adding tables in a CS database and employing the readiness monitor and the helper pod disclosed herein to populate and update the tables with up-to-date readiness information and load balancing information. As the load of a system increases, the number of instances also increases dynamically automatically. All the configurations of the instances are managed using fully-qualified domain names provided by the host name DNS. In embodiments disclosed herein, when a new instance is initiated, the configuration details can be provided by the configuration cache manager or from the database. The configuration cache manager, in turn, checks the status of the instance periodically and updates the database accordingly (e.g., when the instance is killed).

One embodiment comprises a system comprising a processor and a non-transitory computer-readable storage medium that stores computer instructions translatable by the processor to perform a method substantially as described herein. Another embodiment comprises a computer program product having a non-transitory computer-readable storage medium that stores computer instructions translatable by a processor to perform a method substantially as described herein. Numerous other embodiments are also possible.

These, and other, aspects of the disclosure will be better appreciated and understood when considered in conjunction with the following description and the accompanying drawings. It should be understood, however, that the following description, while indicating various embodiments of the disclosure and numerous specific details thereof, is given by way of illustration and not of limitation. Many substitutions, modifications, additions, and/or rearrangements may be made within the scope of the disclosure without departing from the spirit thereof, and the disclosure includes all such substitutions, modifications, additions, and/or rearrangements.

BRIEF DESCRIPTION OF THE DRAWINGS

The drawings accompanying and forming part of this specification are included to depict certain aspects of the invention. A clearer impression of the invention, and of the components and operation of systems provided with the invention, will become more readily apparent by referring to the exemplary, and therefore non-limiting, embodiments illustrated in the drawings, wherein identical reference numerals designate the same components. Note that the features illustrated in the drawings are not necessarily drawn to scale.

DETAILED DESCRIPTION

The invention and the various features and advantageous details thereof are explained more fully with reference to the non-limiting embodiments that are illustrated in the accompanying drawings and detailed in the following description. Descriptions of well-known starting materials, processing techniques, components, and equipment are omitted so as not to unnecessarily obscure the invention in detail. It should be understood, however, that the detailed description and the specific examples, while indicating some embodiments of the invention, are given by way of illustration only and not by way of limitation. Various substitutions, modifications, additions, and/or rearrangements within the spirit and/or scope of the underlying inventive concept will become apparent to those skilled in the art from this disclosure.

Figure 1:
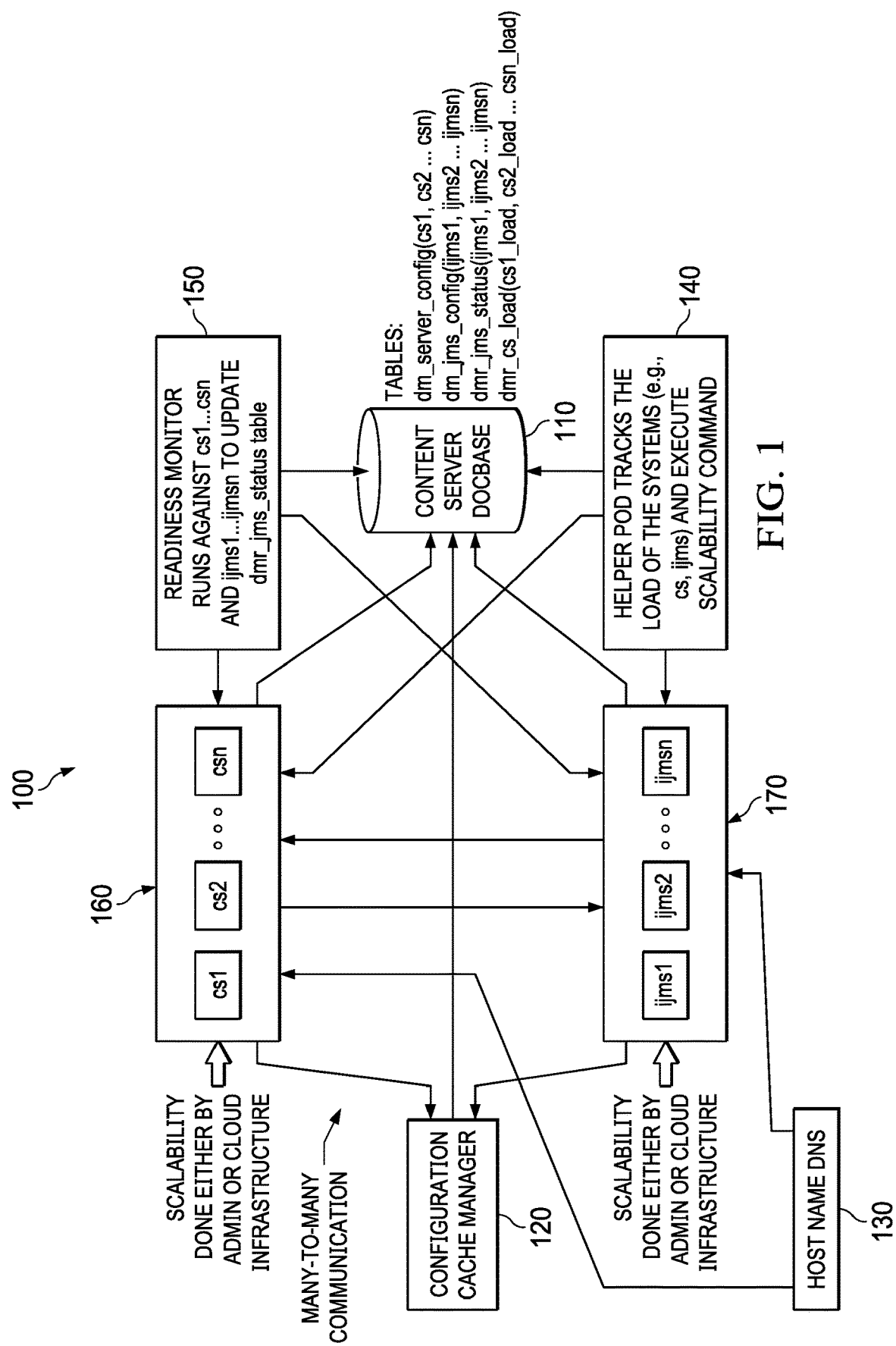
FIG. 1 depicts a diagrammatic representation of an example container orchestration cloud environment where embodiments disclosed herein can be implemented.

FIG. 1 depicts a diagrammatic representation of an example container orchestration cloud environment where embodiments disclosed herein can be implemented. As discussed above, in an on-premises enterprise architecture, high availability between subsystems is made possible through configuration management of setup in a centralized database. Although cloud infrastructure supports load balancing, the challenge comes with proprietary session management which does not provide the same flexibility when the load balancing is maintained by the application layer. Thus, for a native or complex applications to adapt to cloud scalability and high availability, it might require architectural change which would take time and which would not be feasible in some cases.

In container orchestration cloud environment 100, scalability is done dynamically. For instance, a readiness monitor 150 tracks the number of user requests for an application (which is a subsystem of a CMS) and if the load increases, it spawns additional instances of the application (e.g., CS1 . . . CSn 160, independent JMS1 . . . iJMSn 170, etc.) dynamically.

In some embodiments, readiness monitor 150 (which, in some embodiments, implements a readiness script) can be adapted for monitoring the state of each container running in container orchestration cloud environment 100. Readiness monitor 150 can run periodically. The period value is configurable. Outcome of readiness monitor 150 can be used to track the pod status by executing a scalability command (which is typically used in a container orchestration system). A table is maintained in a database 110 (e.g., Content Server Docbase) and readiness monitor 150 can send the periodic refreshment command to the main subsystem running in container orchestration cloud environment 100. As discussed below, the status of each corresponding system is checked and the table is updated accordingly.

Although the cloud infrastructure also supports auto scalability, the auto scaling feature is not available for native applications. This is because a request for a native application does not go through the cloud infrastructure. To achieve auto scalability for native applications, a helper pod 140 is deployed in container orchestration cloud environment 100. Helper pod 140 is adapted for monitoring the load of a system and proactively increases or decreases the number of instances of the system, depending on the load.

In container orchestration cloud environment 100, all the configurations are managed using the hostnames. In container orchestration cloud environment 100, either fixed hostnames are supported inherently or it must be done using a third party (e.g., Host Name DNS 130). To communicate among the pods using the hostname, the hostname must be a fully-qualified domain name (FQDN). In some environment, the mapping between a host name (which can be found in the instance data) and its FQDN must be done explicitly in the operation system level which can be achieved using a startup script.

Getting the configuration object from the database for each operation can be very costly. Also, ignoring the new instances will reduce the efficiency of the overall system. Thus, the invention includes a configuration cache management system 120 (which is referred to herein as a configuration cache manager).

Configuration cache manager 120 is adapted for inquiring database 110 for the instance status periodically. Whenever a new instance spawns up, configuration cache manager 120 can get the configuration details either locally from a configuration cache managed by configuration cache manager 120 or directly from database 110.

In some cases, the configuration version numbers can be validated by configuration cache manager 120 before any operation, for instance, by checking a configuration version number stored in the cache with a configuration version number in the instance data. If the numbers match, the new instance can continue. Otherwise, configuration cache manager 120 will update the configuration information before continuing.

Figure 2:
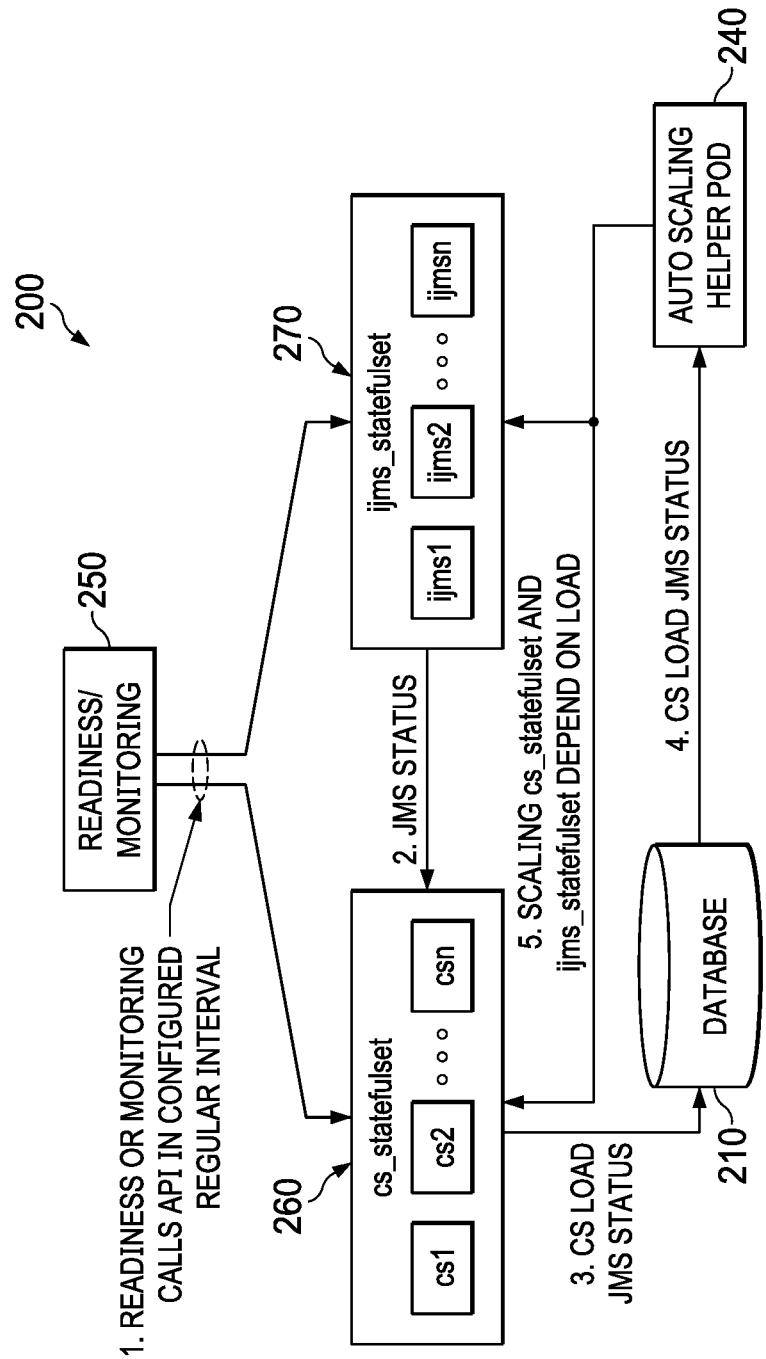
FIG. 2 is a flow diagram illustrating an example of how a readiness monitor and a helper pod operate to populate/update a database with load balancing data and tracking information on system status according to some embodiments.

FIG. 2 is a flow diagram illustrating an example of how a readiness monitor (e.g., readiness monitor 250) and a helper pod (e.g., auto-scaling helper pod 240) operate to populate/update a database (e.g., database 210) with load balancing data and tracking information on system status according to some embodiments.

In the example of FIG. 2, flow 200 begins with a readiness component orchestrator (e.g., readiness monitor 250) calling or otherwise invoking a load monitoring component (1). The load data of the CS and iJMS subsystems (e.g., subsystems 260, 270) are stored in database tables (e.g., a "CS load" table and a "JMS status" table in database 210) (2, 3). The helper pod has the load configuration and gets the load data from the database (4). Depending on the configurations and the load data, the CS statefulset and iJMS statefulset will be scaled (up or down) (5).

In a container orchestration system, "statefulset" refers to a workload application programming interface (API) object used to manage stateful applications. A statefulset manages pods that are based on an identical container specification and maintains a sticky identity for each of the pods.

Figure 3:
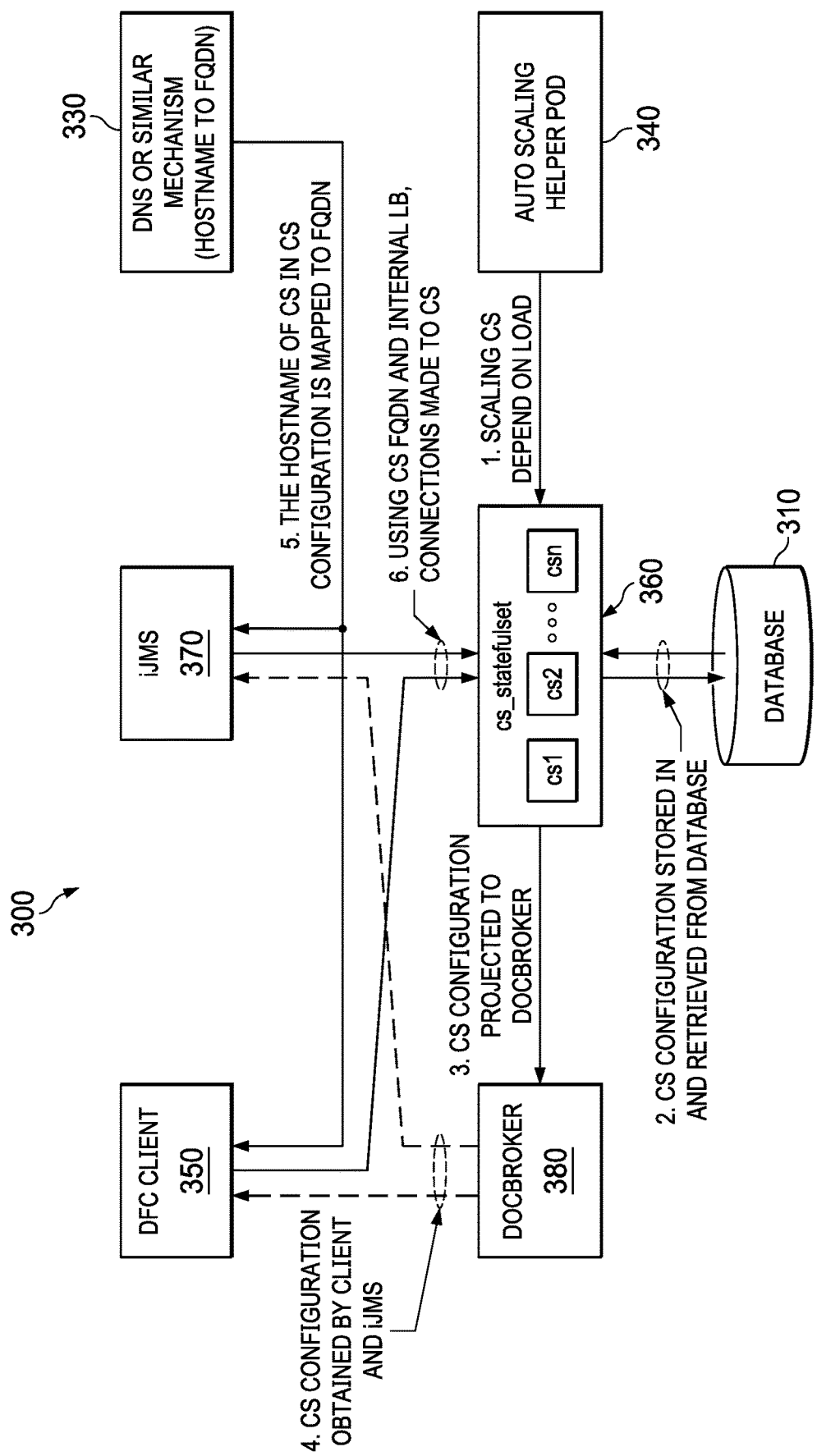
FIG. 3 is a flow diagram illustrating an example of how high availability and efficient scalability of a content server can be achieved utilizing the up-to-date instance data and mapping a hostname in the instance data to a fully-qualified domain name according to some embodiments.

FIG. 3 is a flow diagram illustrating an example of how high availability and efficient scalability of a content server can be achieved utilizing the up-to-date instance data and mapping a hostname in the instance data to a fully-qualified domain name according to some embodiments.

In the example of flow 300, depending on the load, a helper pod (e.g., auto scaling helper pod 340) can scale a CS statefulset (1) in a similar manner as described above with reference to FIG. 2. The new instance data (e.g., for CS subsystem 360) can be stored in a database table (e.g., a "CS configuration" table in database 310) and projected to a discovery service referred to in FIG. 3 as "Docbroker 380" (2, 3).

As shown in FIG. 3, a Documentum Foundation Classes (DFC) client 350 and an iJMS 370 can obtain the new instance data for CS subsystem 360 from the discovery service (4). DFC client, iJMS, and Docbroker are known to those skilled in the art and thus are not further described herein.

The hostname in the instance data obtained from the discovery service can be mapped to a FQDN using a DNS service or similar mechanism 330 (5). Using the CS FQDN and internal load balancing mechanism, DFC client 350 and iJMS 370 can then make the connections to CS subsystem 360 (6).

Figure 4:
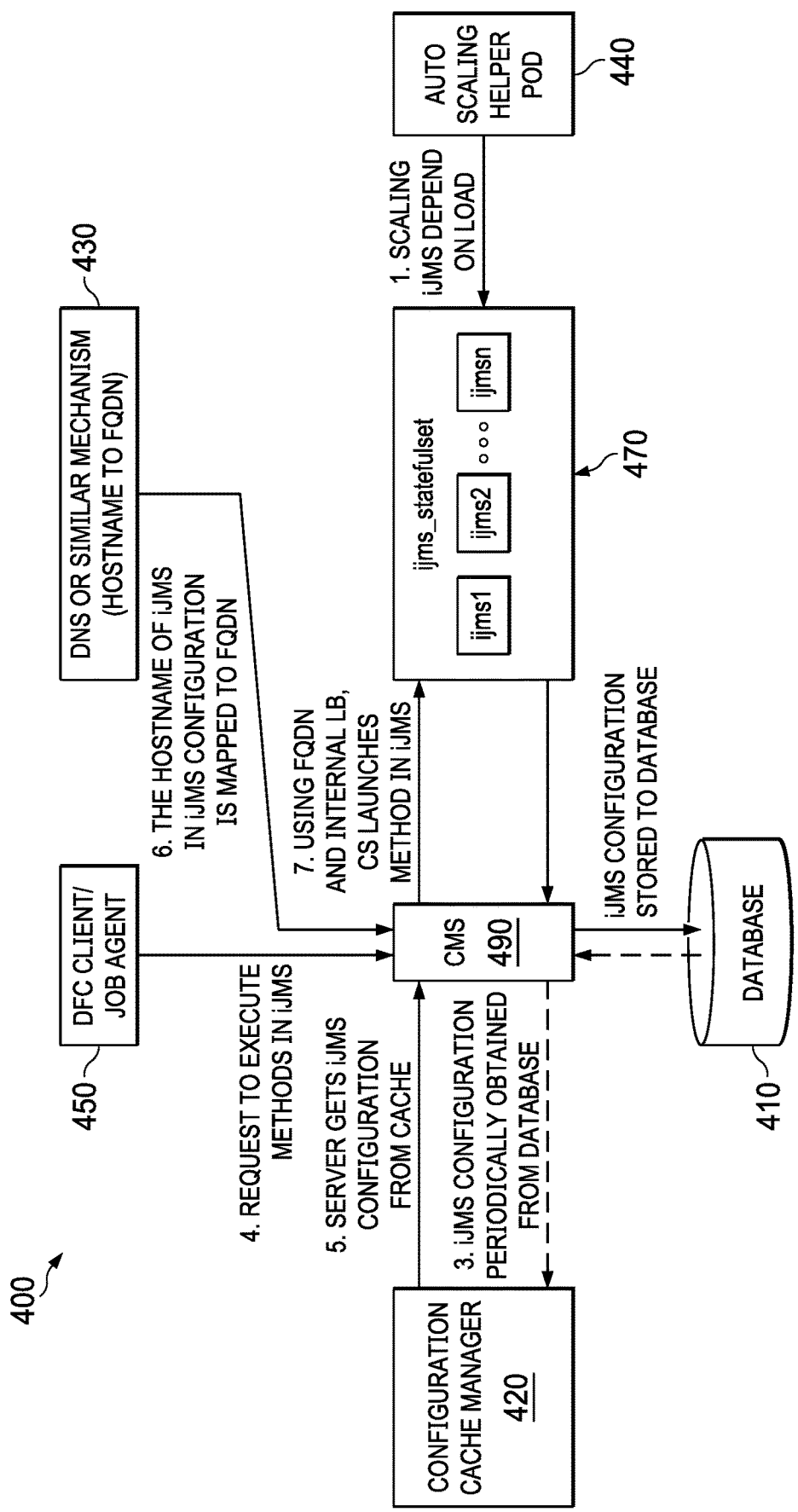
FIG. 4 is a flow diagram illustrating another example of how high availability and efficient scalability of JMS can be achieved by utilizing a configuration cache manager that stores up-to-date instance data according to some embodiments.

FIG. 4 is a flow diagram illustrating another example of how high availability and efficient scalability of a JMS subsystem 470 can be achieved by utilizing a configuration cache manager 420 that stores up-to-date instance data according to some embodiments.

In the example of flow 400, depending on the load, a helper pod (e.g., auto-scaling helper pod 440) can scale an iJMS statefulset for JMS subsystem 470 in a similar manner as described above with reference to FIG. 2 (1). The new instance data for JMS subsystem 470 can be stored into a database table (e.g., a "iJMS configuration" table in database 410) (2). In this case, a configuration cache manager 420 periodically obtains iJMS configuration data from the database 410 (3).

As illustrated in FIG. 4, a request to execute methods in JMS subsystem 470 is sent from a DFC client (or a job agent) 450 to a cloud-based CS (e.g., CMS 490) to execute a method in JMS subsystem 470 (4). The cloud-based CS gets the latest iJMS details from a cache (which is managed by configuration cache manager 420) (5). Here, an internal efficient mechanism is used to compare the data between the cloud-based CS and the cache. The hostname in the instance data is mapped to a FQDN using a DNS service or similar mechanism 430 (6). Using the FQDN and the internal load balancing mechanism, a connection (or connections) can be made to JMS subsystem 470 to execute the requested method (7).

In summary, embodiments disclosed herein take a four-step approach which includes providing a readiness monitor or orchestrator with the ability to monitor the readiness of an application in a container orchestration cloud environment, establishing a communication with each subsystem, providing an efficient configuration management to manage availability of each subsystem (e.g., as load increases, increase instances), and using an auto-scaling helper pod for scaling. With this approach, embodiments disclosed herein can efficiently manage the changing of instances and corresponding configuration data, allowing the number of instances to scale (increase or decrease) dynamically to provide content management in a cloud computing environment.

Figure 5:
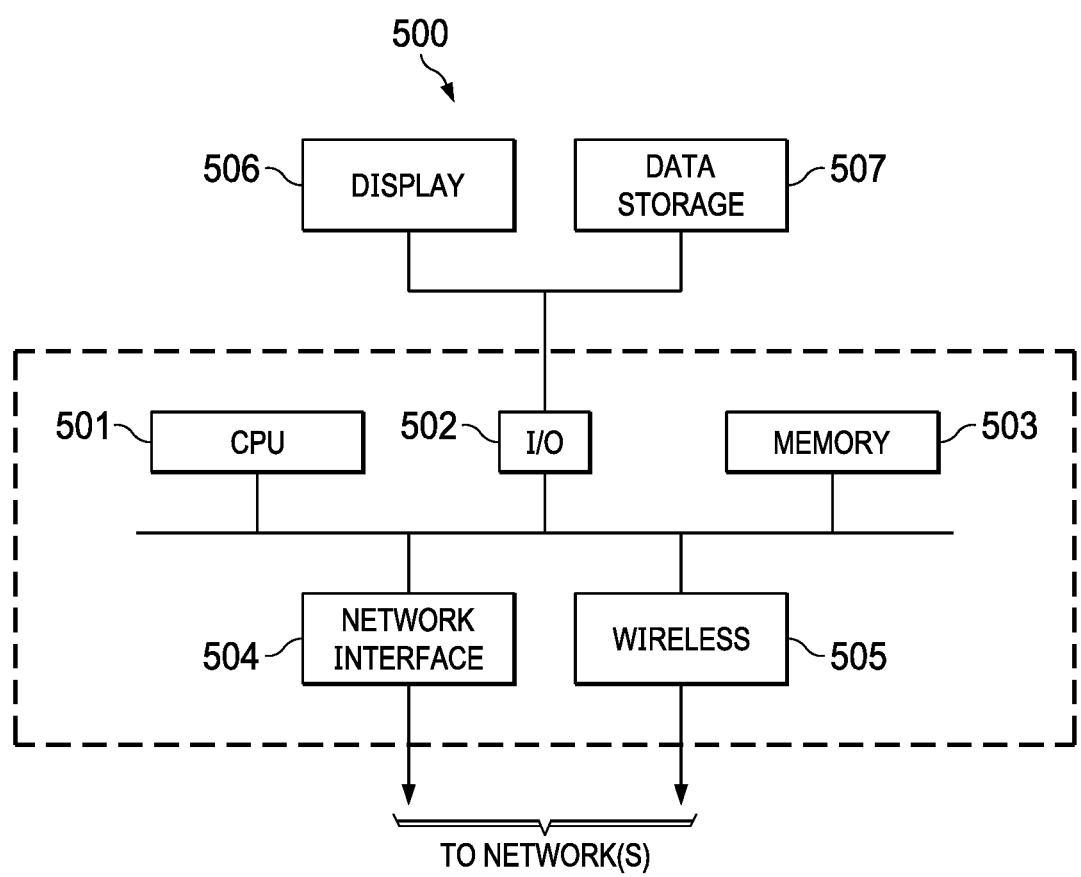
FIG. 5 depicts a diagrammatic representation of a data processing system for implementing an embodiment disclosed herein.

FIG. 5 depicts a diagrammatic representation of a data processing system for implementing an embodiment disclosed herein. As shown in FIG. 5, data processing system 500 may include one or more central processing units (CPU) or processors 501 coupled to one or more user input/output (I/O) devices 502 and memory devices 503. Examples of I/O devices 502 may include, but are not limited to, keyboards, displays, monitors, touch screens, printers, electronic pointing devices such as mice, trackballs, styluses, touch pads, or the like. Examples of memory devices 503 may include, but are not limited to, hard drives (HDs), magnetic disk drives, optical disk drives, magnetic cassettes, tape drives, flash memory cards, random access memories (RAMs), read-only memories (ROMs), smart cards, etc. Data processing system 500 can be coupled to display 506, information device 507 and various peripheral devices (not shown), such as printers, plotters, speakers, etc. through I/O devices 502. Data processing system 500 may also be coupled to external computers or other devices through network interface 504, wireless transceiver 505, or other means that is coupled to a network such as a local area network (LAN), wide area network (WAN), or the Internet.

Those skilled in the relevant art will appreciate that the invention can be implemented or practiced with other computer system configurations, including without limitation multi-processor systems, network devices, mini-computers, mainframe computers, data processors, and the like. The invention can be embodied in a computer, or a special purpose computer or data processor that is specifically programmed, configured, or constructed to perform the functions described in detail herein. The invention can also be employed in distributed computing environments, where tasks or modules are performed by remote processing devices, which are linked through a communications network such as a LAN, WAN, and/or the Internet. In a distributed computing environment, program modules or subroutines may be located in both local and remote memory storage devices. These program modules or subroutines may, for example, be stored or distributed on computer-readable media, including magnetic and optically readable and removable computer discs, stored as firmware in chips, as well as distributed electronically over the Internet or over other networks (including wireless networks). Example chips may include Electrically Erasable Programmable Read-Only Memory (EEPROM) chips. Embodiments discussed herein can be implemented in suitable instructions that may reside on a non-transitory computer readable medium, hardware circuitry or the like, or any combination and that may be translatable by one or more server machines. Examples of a non-transitory computer readable medium are provided below in this disclosure.

Suitable computer-executable instructions may reside on a non-transitory computer readable medium (e.g., ROM, RAM, and/or HD), hardware circuitry or the like, or any combination thereof. Within this disclosure, the term "non-transitory computer readable medium" is not limited to ROM, RAM, and HD and can include any type of data storage medium that can be read by a processor. Examples of non-transitory computer-readable storage media can include, but are not limited to, volatile and non-volatile computer memories and storage devices such as random access memories, read-only memories, hard drives, data cartridges, direct access storage device arrays, magnetic tapes, floppy diskettes, flash memory drives, optical data storage devices, compact-disc read-only memories, and other appropriate computer memories and data storage devices. Thus, a computer-readable medium may refer to a data cartridge, a data backup magnetic tape, a floppy diskette, a flash memory drive, an optical data storage drive, a CD-ROM, ROM, RAM, HD, or the like.

The processes described herein may be implemented in suitable computer-executable instructions that may reside on a computer readable medium (for example, a disk, CD-ROM, a memory, etc.). Alternatively, the computer-executable instructions may be stored as software code components on a direct access storage device array, magnetic tape, floppy diskette, optical storage device, or other appropriate computer-readable medium or storage device.

Any suitable programming language can be used to implement the routines, methods or programs of embodiments of the invention described herein, including C, C++, Java, JavaScript, HTML, or any other programming or scripting code, etc. Other software/hardware/network architectures may be used. For example, the functions of the disclosed embodiments may be implemented on one computer or shared/distributed among two or more computers in or across a network. Communications between computers implementing embodiments can be accomplished using any electronic, optical, radio frequency signals, or other suitable methods and tools of communication in compliance with known network protocols.

Different programming techniques can be employed such as procedural or object oriented. Any particular routine can execute on a single computer processing device or multiple computer processing devices, a single computer processor or multiple computer processors. Data may be stored in a single storage medium or distributed through multiple storage mediums, and may reside in a single database or multiple databases (or other data storage techniques). Although the steps, operations, or computations may be presented in a specific order, this order may be changed in different embodiments. In some embodiments, to the extent multiple steps are shown as sequential in this specification, some combination of such steps in alternative embodiments may be performed at the same time. The sequence of operations described herein can be interrupted, suspended, or otherwise controlled by another process, such as an operating system, kernel, etc. The routines can operate in an operating system environment or as stand-alone routines. Functions, routines, methods, steps, and operations described herein can be performed in hardware, software, firmware or any combination thereof.

Embodiments described herein can be implemented in the form of control logic in software or hardware or a combination of both. The control logic may be stored in an information storage medium, such as a computer-readable medium, as a plurality of instructions adapted to direct an information processing device to perform a set of steps disclosed in the various embodiments. Based on the disclosure and teachings provided herein, a person of ordinary skill in the art will appreciate other ways and/or methods to implement the invention.

It is also within the spirit and scope of the invention to implement in software programming or code an of the steps, operations, methods, routines or portions thereof described herein, where such software programming or code can be stored in a computer-readable medium and can be operated on by a processor to permit a computer to perform any of the steps, operations, methods, routines or portions thereof described herein. The invention may be implemented by using software programming or code in one or more digital computers, by using application specific integrated circuits, programmable logic devices, field programmable gate arrays, optical, chemical, biological, quantum or nano-engineered systems, components, and mechanisms may be used. In general, the functions of the invention can be achieved by any means as is known in the art. For example, distributed, or networked systems, components, and circuits can be used. In another example, communication or transfer (or otherwise moving from one place to another) of data may be wired, wireless, or by any other means.

A "computer-readable medium" may be any medium that can contain, store, communicate, propagate, or transport the program for use by or in connection with the instruction execution system, apparatus, system, or device. The computer readable medium can be, by way of example only but not by limitation, an electronic, magnetic, optical, electromagnetic, infrared, or semiconductor system, apparatus, system, device, propagation medium, or computer memory. Such computer-readable medium shall generally be machine readable and include software programming or code that can be human readable (e.g., source code) or machine readable (e.g., object code). Examples of non-transitory computer-readable media can include random access memories, read-only memories, hard drives, data cartridges, magnetic tapes, floppy diskettes, flash memory drives, optical data storage devices, compact-disc read-only memories, and other appropriate computer memories and data storage devices. In an illustrative embodiment, some or all of the software components may reside on a single server computer or on any combination of separate server computers. As one skilled in the art can appreciate, a computer program product implementing an embodiment disclosed herein may comprise one or more non-transitory computer readable media storing computer instructions translatable by one or more processors in a computing environment.

A "processor" includes any, hardware system, mechanism or component that processes data, signals or other information. A processor can include a system with a central processing unit, multiple processing units, dedicated circuitry for achieving functionality, or other systems. Processing need not be limited to a geographic location, or have temporal limitations. For example, a processor can perform its functions in "real-time," "offline," in a "batch mode," etc. Portions of processing can be performed at different times and at different locations, by different (or the same) processing systems.

As used herein, the terms "comprises," "comprising," "includes," "including," "has," "having," or any other variation thereof, are intended to cover a non-exclusive inclusion. For example, a process, product, article, or apparatus that comprises a list of elements is not necessarily limited only those elements but may include other elements not expressly listed or inherent to such process, product, article, or apparatus.

Furthermore, the term "or" as used herein is generally intended to mean "and/or" unless otherwise indicated. For example, a condition A or B is satisfied by any one of the following: A is true (or present) and B is false (or not present), A is false (or not present) and B is true (or present), and both A and B are true (or present). As used herein, including the accompanying appendices, a term preceded by "a" or "an" (and "the" when antecedent basis is "a" or "an") includes both singular and plural of such term, unless clearly indicated otherwise (i.e., that the reference "a" or "an" clearly indicates only the singular or only the plural). Also, as used in the description herein and in the accompanying appendices, the meaning of "in" includes "in" and "on" unless the context clearly dictates otherwise.

Although the foregoing specification describes specific embodiments, numerous changes in the details of the embodiments disclosed herein and additional embodiments will be apparent to, and may be made by, persons of ordinary skill in the art having reference to this disclosure. In this context, the specification and figures are to be regarded in an illustrative rather than a restrictive sense, and all such modifications are intended to be included within the scope of this disclosure. The scope of the present disclosure should be determined by the following claims and their legal equivalents.

What is claimed is:

1. A method, comprising:
   obtaining, by a readiness component orchestrator operating in a container orchestration cloud environment, load data of a content server (CS) subsystem and an independent Java method server (iJMS) subsystem running in the container orchestration cloud environment;
   storing, by the readiness component orchestrator, the load data of the CS subsystem and the iJMS subsystem in a database table; and
   scaling, by an auto-scaling helper pod operating in the container orchestration cloud environment, each of the CS subsystem and the iJMS subsystem depending upon the load data and configuration data of the CS subsystem and the iJMS subsystem to thereby maintain high availability of the CS subsystem and the iJMS subsystem in the container orchestration cloud environment.

2. The method according to claim 1, wherein the configuration data of the CS subsystem and the iJMS subsystem are stored in a cache managed by a configuration cache manager or in a centralized database in the container orchestration cloud environment.

3. The method according to claim 2, wherein the configuration data of the CS subsystem and the iJMS subsystem are managed using fully-qualified domain names (FQDNs).

4. The method according to claim 3, further comprising:
   obtaining a hostname from the configuration data;
   mapping the hostname to a FQDN using a Domain Name System (DNS) service; and
   making a connection to the FQDN, wherein the FQDN is associated with the CS subsystem or the iJMS subsystem.

5. The method according to claim 1, wherein the scaling comprises scaling a CS statefulset for the CS subsystem up or down.

6. The method according to claim 1, wherein the scaling comprises scaling an iJMS statefulset for the iJMS subsystem up or down.

7. The method according to claim 1, wherein the obtaining comprising calling, by the readiness component orchestrator, a load monitoring component operating in the container orchestration cloud environment.

8. A system, comprising:
   a processor;
   a non-transitory computer-readable medium; and
   stored instructions translatable by the processor for:
      obtaining load data of a content server (CS) subsystem and an independent Java method server (iJMS) subsystem running in a container orchestration cloud environment;
      storing the load data of the CS subsystem and the iJMS subsystem in a database table; and
      scaling each of the CS subsystem and the iJMS subsystem depending upon the load data and configuration data of the CS subsystem and the iJMS subsystem to thereby maintain high availability of the CS subsystem and the iJMS subsystem in the container orchestration cloud environment.

9. The system of claim 8, wherein the configuration data of the CS subsystem and the iJMS subsystem are stored in a cache managed by a configuration cache manager or in a centralized database in the container orchestration cloud environment.

10. The system of claim 9, wherein the configuration data of the CS subsystem and the iJMS subsystem are managed using fully-qualified domain names (FQDNs).

11. The system of claim 10, wherein the stored instructions are further translatable by the processor for:
    obtaining a hostname from the configuration data;
    mapping the hostname to a FQDN using a Domain Name System (DNS) service; and
    making a connection to the FQDN, wherein the FQDN is associated with the CS subsystem or the iJMS subsystem.

12. The system of claim 8, wherein the scaling comprises scaling a CS statefulset for the CS subsystem up or down.

13. The system of claim 8, wherein the scaling comprises scaling an iJMS statefulset for the iJMS subsystem up or down.

14. The system of claim 8, wherein the obtaining comprising calling a load monitoring component operating in the container orchestration cloud environment.

15. A computer program product comprising a non-transitory computer-readable medium storing instructions translatable by a processor for:
    obtaining load data of a content server (CS) subsystem and an independent Java method server (iJMS) subsystem running in a container orchestration cloud environment;
    storing the load data of the CS subsystem and the iJMS subsystem in a database table; and
    scaling each of the CS subsystem and the iJMS subsystem depending upon the load data and configuration data of the CS subsystem and the iJMS subsystem to thereby maintain high availability of the CS subsystem and the iJMS subsystem in the container orchestration cloud environment.

16. The computer program product of claim 15, wherein the configuration data of the CS subsystem and the iJMS subsystem are stored in a cache managed by a configuration cache manager or in a centralized database in the container orchestration cloud environment.

17. The computer program product of claim 16, wherein the configuration data of the CS subsystem and the iJMS subsystem are managed using fully-qualified domain names (FQDNs).

18. The computer program product of claim 17, wherein the stored instructions are further translatable by the processor for:

obtaining a hostname from the configuration data;
mapping the hostname to a FQDN using a Domain Name System (DNS) service; and
making a connection to the FQDN, wherein the FQDN is associated with the CS subsystem or the iJMS subsystem.

19. The computer program product of claim 15, wherein the scaling comprises scaling a CS statefulset for the CS subsystem up or down.

20. The computer program product of claim 15, wherein the scaling comprises scaling an iJMS statefulset for the iJMS subsystem up or down.

* * * * *